Nov. 28, 1950     R. MOSCA     2,531,783

PHOTOGRAPHIC CAMERA

Filed Aug. 17, 1949     2 Sheets-Sheet 1

INVENTOR.
Renato Mosca
BY

Nov. 28, 1950   R. MOSCA   2,531,783
PHOTOGRAPHIC CAMERA
Filed Aug. 17, 1949   2 Sheets-Sheet 2
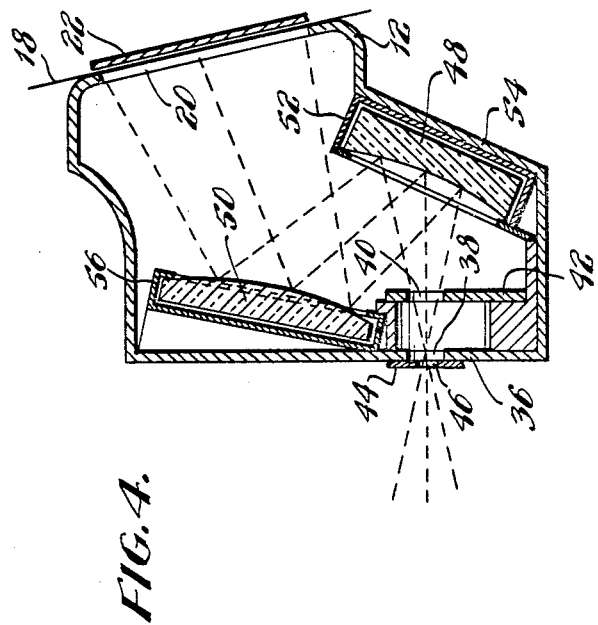
FIG. 4.
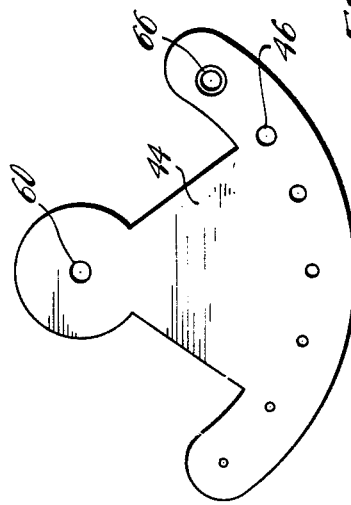
FIG. 3.
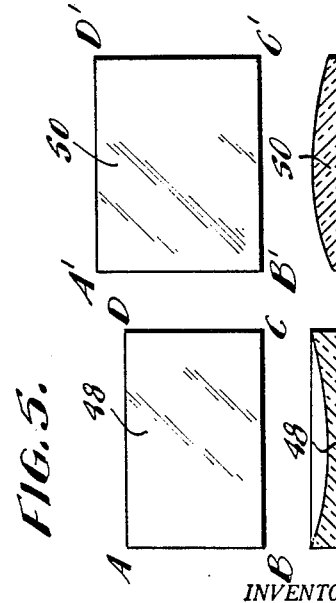
FIG. 5.   FIG. 7.
FIG. 6.   FIG. 8.
INVENTOR.
Renato Mosca
BY Patented Nov. 28, 1950

2,531,783

UNITED STATES PATENT OFFICE 2,531,783

PHOTOGRAPHIC CAMERA

Renato Mosca, Trieste, Italy, assignor, by mesne assignments, to Macy Camera Corp., New York, N. Y.

Application August 17, 1949, Serial No. 110,789
In Switzerland May 24, 1946

6 Claims. (Cl. 95—11)

The present application is a continuation-in-part of my U. S. patent applications Serial No. 744,880, filed April 30, 1947, now abandoned, for "Photographic or Cinematographic Camera with Exclusively Reflecting Optical Organs," and Serial No. 49,476, filed September 16, 1948, now abandoned, for "Photographic Camera with Optical Objective of the Mirror Type."

Under the term "photographic camera" a camera with a photographic plate or film, and, in the latter case, either a photographic camera proper or a cinematographic camera is to be understood.

It is an object of my invention to provide a camera which is free from chromatic aberration.

It is another object of my invention to provide a camera which is particularly suitable for color photography.

It is a further object of my invention to provide a camera which is free from astigmatism.

It is still a further object of my invention to provide a camera free from distortions and deformations of the image.

Other objects of my present invention will become apparent from the detailed description of an embodiment of my invention given herebelow.

The camera according to the present invention comprises in its broadest aspect a stenoscopic camera comprising in combination a wall with a very small image-creating stenoscopic entrance opening, a converging mirror arranged in the stenoscopic camera in the path of the rays entering the stenoscopic camera through the very small image-creating stenoscopic entrance opening, a diverging mirror arranged in the stenoscopic camera in the path of the rays reflected by the converging mirror, and a carrier for a photosensitive surface arranged in the stenoscopic camera in the path of the rays reflected by the diverging mirror.

Preferably, the converging mirror is arranged at a distance from the entrance opening not exceeding the focal length of the converging mirror.

In a preferred embodiment of my invention, the mirrors are designed as spherical concave and convex mirrors, respectively, and the axis of the concave mirror is inclined to the axis of the entrance opening preferably at an angle of about 23°, whereas the axis of the convex mirror is inclined to the axis of the entrance opening and to the axis of the concave mirror, preferably by including with the axis of the entrance opening an angle of about 12°.

The carrier for the photosensitive surface is preferably a plane carrier having an inclination with respect to the axis of the entrance opening of about 78°.

The convex spherical mirror has preferably an appreciably greater focal length than the concave spherical mirror, the ratio of the focal length being preferably 3:2. In one preferred embodiment of the invention, the spherical concave mirror has a radius of curvature substantially equal to 70 mm. which makes the focal length equal to 35 mm., and the convex spherical mirror has a radius of curvature substantially equal to 105 mm. which makes the focal length equal to 52½ mm. The size of the photographic image is hereby 24 x 36 mm. With a size of 35 x 55 mm. of the image, the corresponding values are 90 mm. for the radius of curvature for the concave mirror and 135 mm. for the radius of curvature of the convex mirror.

Preferably, the camera is provided with a rotatable sector having several entrance openings between, for instance, 0.8 to 2.25 mm. diameter which can be brought alternatively into position. Preferably, the sector is provided with one or more converging lenses, preferably of small focal length, for enabling the camera to be used for taking images of quite near and small objects.

According to one embodiment of the present invention, a mirror, preferably a slightly convex mirror, is arranged on the frontal portion of the casing and serves in taking self-photographs by reflecting an image to the user of the camera.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a front elevation of a sector forming part of the camera shown in Fig. 1;

Fig. 4 is a longitudinal section of the stenoscopic camera showing the path of the rays from the entrance opening to the photosensitive surface;

Fig. 5 is a plan view of the concave mirror forming part of the camera shown in Fig. 1;

Fig. 6 is a cross section of the mirror shown in Fig. 5; and

Fig. 7 and Fig. 8 are similar views for the convex mirror.

Figure 1:
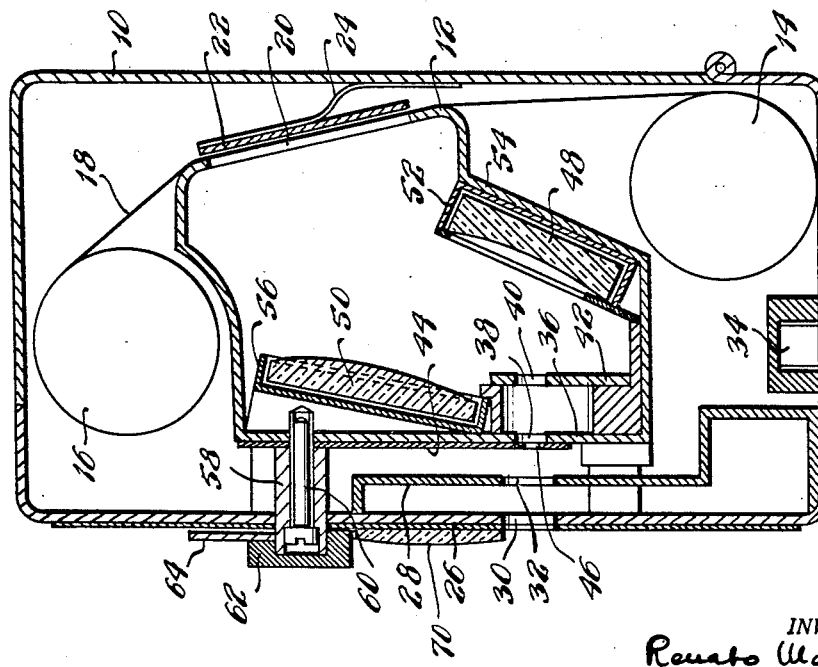
Fig. 1 is a sectional side elevation taken along line I—I of Figure 2 of an embodiment of the present invention.

Referring now to the drawings and first to Figure 1, the camera is shown to comprise an outer casing 10 which accommodates a stenoscopic camera 12 and two spools 14 and 16 for a film 18. The film 18 unwinds from the spool 14, which is arranged in the lower rear portion of the casing 10, passes along a plane opening 20 in the upper rear wall of the stenoscopic camera 12, and is wound on the spool 16 which is arranged in the upper portion of casing 10. A guiding plate 22 for the portion of the film 18 running across the opening 20 is supported by a resilient member 24 secured with one end thereof to the casing 10.

The lower portion of the front of casing 10 is double-walled and comprises a front wall 26 extending over the whole front of casing 10 and a substantially parallel wall 28 extending over the lower two-thirds of the casing 10. The walls 26 and 28 are provided with aligned holes 30 and 32, preferably of rectangular cross section, for the entrance of light rays into the casing. The interior of the chamber formed by the walls 26 and 28 is preferably blackened.

On the lower side of the casing 10 a screw thread 34 is provided for connecting the camera to a stand (not shown).

The stenoscopic camera 12 arranged inside the casing 10 contains in its lower front wall 36 and opening 38 and in alignment with the latter an opening 40 in a wall 42 arranged parallel to the wall 36 over its lower portion. The space between the walls 36 and 42 is preferably blackened, and the holes 38 and 40 are a little but not much out of alignment with the holes 30 and 32. In front of the front wall 36 a sector 44 is rotatably arranged which will be described in more detail hereinafter with reference to Figure 3. The sector 44 is provided with small entrance openings 46 which can be brought in front of, but are smaller than, the opening 38 and limit the beam of rays entering the stenoscopic camera 12.

Inside the stenoscopic camera 12, a converging mirror 48 and a diverging mirror 50 are provided. The converging mirror 48 is designed as a spherical concave mirror and arranged within a holder 52 at the inclined lower portion of the rear wall 54 of the stenoscopic camera. Preferably, the distance between the entrance opening 46 and the concave mirror 48 does not exceed the focal length of the concave mirror so that the latter forms a virtual image of the opening 46. The diverging mirror 50 is preferably designed as a spherical convex mirror and arranged in a holder 56 in the upper front portion of the stenoscopic camera 12 at an inclination to the axis of the entrance opening 46 and to the axis of the concave mirror 48 as more fully described hereinafter. The diverging mirror 50 forms a real image on the film 18 of the virtual image of the entrance opening formed by the converging mirror 48.

Figure 2:
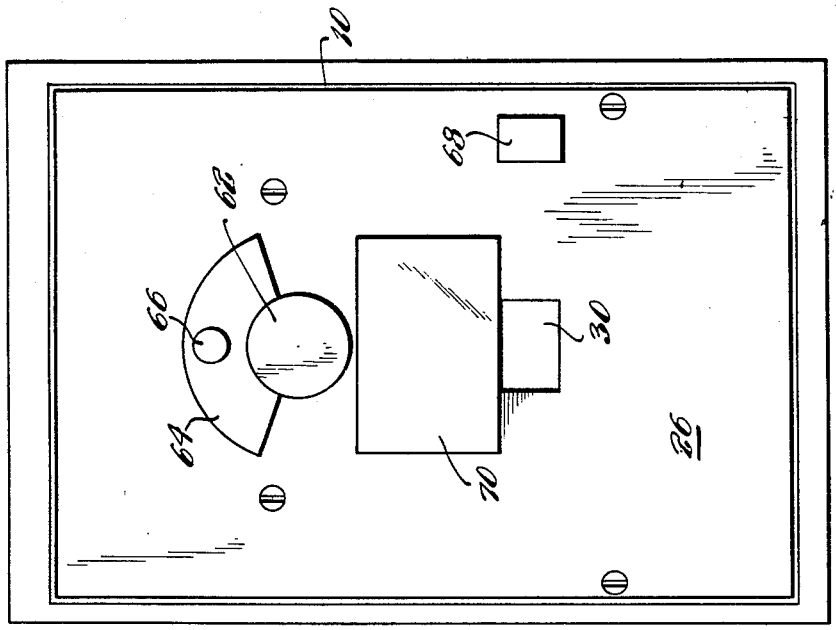
Fig. 2 is a front view of the camera shown in Fig. 1.

The sector 44 arranged in front of the stenoscopic camera 12 is shown separately in Figure 3. It is rigidly connected to a hub 58 rotatable about a pivot 60 arranged in the stenoscopic camera 12 and reaching to the front of the casing 10. The hub 58 is rigidly connected to a knob 62 which in turn is rigidly connected to a disc 64 in front of the casing 10. The disc 64 is provided with a hole (Figure 2) through which indications, for instance numbers corresponding to the entrance opening 46 which happens to be in alignment with the opening 38, can be seen. By turning the knob 62, the various openings 46 can be brought in alignment with the entrance hole 38 of the stenoscopic camera 12. The sector has preferably entrance openings from 0.8 to 2.25 mm. and apart from that it has one or more lenses 66 which will be described more fully hereinafter. The centers of the openings 46 and the lenses 66 are on a circle having its center at the pivot 60.

The concave mirror 48 and the convex mirror 50 are both cut in the manner shown in Figures 5 and 6 and in Figures 7 and 8, respectively. The concave mirror 48 is bounded in a horizontal projection by a rectangle as shown in Figure 5, the side A—B being shorter than the side B—C. The corresponding side A'—B' of the mirror 50 is larger than the side A—B of the mirror 48, whereas the side B'—C' of mirror 50 has the same length as the side B—C. Thus, it will be seen that both mirrors have a rectangular projection with the projection of mirror 50 appreciably larger than the projection of mirror 48. A numerical example is 17 x 28 mm. for the projection of the concave mirror and 22 x 28 for the convex mirror, these values holding for a radius of curvature of 70 mm. for the concave mirror and 105 mm. for the radius of curvature for the convex mirror.

Furthermore, the mirrors 48 and 50 have different focal lengths, the ratio of the focal length of the convex mirror to the focal length of the concave mirror being preferably substantially equal to 3:2.

The inclinations of the several parts of the stenoscopic camera are preferably chosen in the following manner: Taking the axis of the entrance opening horizontal, the concave mirror 48 has preferably its axis inclined at an angle of about 23° to the axis of the entrance opening. The convex mirror 50 has preferably its axis inclined at an angle of about 12° with respect to the axis of the entrance opening so that the convex mirror and the concave mirror have an inclination of their axes amounting to approximately 11°. The film has its plane surface inclined to the axis of the entrance opening at an angle of about 78°, that is to say the convex mirror 50 and the plane portion of the film 18 together with the carrier 22 have oppositely equal inclinations to the axis of the entrance opening.

The numerical values of the focal length and the radii of curvature of the mirrors depend on the size of the image. With a size of 24 x 36 mm. the concave mirror should have a radius of curvature of 70 mm., i. e. a focal length of 35 mm., whereas the convex mirror should have a radius of curvature of 105 mm., i. e. a focal length of 52½ mm. The distance from the entrance opening to the foot point of the axis of the concave mirror should be 20 mm. and the same should be the distance between the foot points of the axes of the concave and convex mirror, whereas the distance between the foot point of the axis of the convex mirror and the center of symmetry of the film should be 23 mm. Therefore the total distance amounts to 63 mm., i. e. 10% less than the radius of curvature of the concave mirror.

With an image having the size 35 x 55 mm., the corresponding numbers are 90 mm. for the radius of curvature of the concave mirror, 135 mm. for the radius of curvature of the convex mirror, and 27 mm. for each of the three distances mentioned above. Therefore, the total distance is 81 mm., i. e. 10% less than the radius of curvature of the concave mirror.

It will be seen that the total path of the rays is long in comparison to the depth of the camera.

The optical axes of the entrance opening 46, the concave mirror 48, and the convex mirror 50 are arranged in one plane with a normal of the film 18, said plane being preferably vertical.

Referring now to Figure 4, it will be seen that the different incident rays, such as a, b, c, meeting at the entrance opening 46 of the sector 44 and passing through the holes 38 and 40 of the stenoscopic camera 12, are reflected by the concave mirror 48 and the convex mirror 50 and thrown on the film 18 in such a way that the paths traversed by the individual rays between the entrance opening 46 and the film 18 are equal.

The operation of this camera is as follows:

The image creating entrance opening 46 limits the bundle of incoming rays to practically a beam starting at the center of the entrance opening, the holes 30, 32, 38, and 40 cutting out the rays which have a relatively large inclination to the axis of the entrance opening. The entering rays are reflected by the concave mirror 48 which, owing to the fact that the distance between the entrance opening and the foot point of the axis of the concave mirror does not exceed its focal length, forms a virtual image of the entrance opening and the object. The rays are then again reflected by the convex mirror which forms a real image on the film 18. Since no lenses are used in the camera according to the invention, it is particularly suitable for color photography.

Distortion is eliminated by a compensation between the deformations due to the two mirrors owing to the ratio of their focal lengths described hereabove, and the elimination of the peripheral portions of the mirrors as described in connection with Figures 5 and 7.

If desired, a view finder or sight 68 may be arranged in the camera near the entrance hole 30.

If it is intended to employ the camera for self-photography, a device for checking the framing of the image may be arranged in front of the camera, preferably between the hole 30 and the knob 62, this device being preferably designed as a slightly convex mirror 70.

If it is desired to take photographs at a very short distance, one or more lenses 66 are provided in the sector 44 as mentioned hereabove. The lens 44 may be a converging lens of small focal length, for instance 4 cm., or a system of lenses for smaller objects. The object is preferably positioned in the focus of the lens or lens system. If desired, several lenses or lens systems may be provided in the sector 44, all with their centers on the same circle around the pivot 60 as the openings 46.

The depth effects obtainable with the camera according to the present invention are true to nature and for this reason the camera is especially suitable for use as a stereoscopic camera.

It will be understood that each of the elements described above, or two or more together, may also find a useful application in other types of photographic cameras, differing from the types described above.

While I have illustrated and described the invention as embodied in photographic cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A stenoscopic camera comprising in combination a wall with a very small image-creating stenoscopic entrance opening acting as "pinhole lens"; a converging mirror arranged in said stenoscopic camera with its axis inclined to the axis of said very small image-creating stenoscopic entrance opening in the path of the rays entering said stenoscopic camera through said very small image-creating stenoscopic entrance opening; a diverging mirror arranged in said stenoscopic camera in the path of the rays reflected by said converging mirror with its axis inclined to the axis of said very small image-creating stenoscopic entrance opening and to the axis of said converging mirror; and a carrier for a photosensitive surface arranged in said stenoscopic camera in a path of the rays reflected by said diverging mirror inclined to the axis of said diverging mirror.

2. A stenoscopic camera comprising in combination a wall with a very small image-creating stenoscopic entrance opening acting as a "pinhole lens"; a concave spherical mirror arranged in said stenoscopic camera with its axis inclined to the axis of said very small image-creating stenoscopic entrance opening in the path of the rays entering said stenoscopic camera through said very small image-creating stenoscopic entrance opening at a distance from said very small image-creating stenoscopic entrance opening not exceeding the focal length of said concave spherical mirror; a convex spherical mirror having appreciably greater focal length than said concave spherical mirror and arranged in said stenoscopic camera in the path of the rays reflected by said concave mirror with its axis inclined to the axis of said concave mirror; and a carrier for a photosensitive surface arranged in said stenoscopic camera in the path of the rays reflected by said convex spherical mirror inclined to the axis of said convex mirror.

3. A stenoscopic camera comprising in combination a wall with a very small image-creating stenoscopic entrance opening acting as a "pinhole lens"; a concave spherical mirror arranged in said stenoscopic camera in the path of the rays entering said stenoscopic camera through said very small image-creating stenoscopic entrance opening with its axis inclined to the axis of said very small image-creating stenoscopic entrance opening; a convex spherical mirror having appreciably greater focal length than said concave spherical mirror and arranged in said stenoscopic camera in the path of the rays reflected by said concave mirror with its axis inclined to the axis of said very small image-creating stenoscopic entrance opening and to the axis of said concave spherical mirror; and a plane carrier for a photosensitive surface arranged in said stenoscopic camera in the path of the rays reflected by said convex spherical mirror inclined to the axis of said concave spherical mirror and to the axis of said convex spherical mirror.

4. A stenoscopic camera comprising a combination a wall with a very small image-creating stenoscopic entrance opening acting as a "pinhole lens"; a concave spherical mirror arranged in said stenoscopic camera in the path of the rays entering said stenoscopic camera through said very small image-creating stenoscopic entrance opening with its axis inclined to the axis of said very small image-creating stenoscopic entrance opening at a distance from said very small image-creating stenoscopic entrance opening not exceeding the focal length of said concave spherical mirror; a convex spherical mirror having appreciably greater focal length than said concave spherical mirror and arranged in said stenoscopic camera in the path of the rays reflected by said concave mirror with its axis inclined to the axis of said very small image-creating stenoscopic entrance opening and to the axis of said concave spherical mirror; and a plane carrier for a photosensitive surface arranged in said stenoscopic camera in the path of the rays reflected by said convex spherical mirror inclined to the axis of said concave spherical mirror and to the axis of said convex spherical mirror.

5. A stenoscopic camera comprising in combination a wall with a very small image-creating stenoscopic entrance opening acting as a "pinhole lens"; a rectangular concave spherical mirror arranged in said stenoscopic camera with its axis inclined to the axis of said very small image-creating stenoscopic entrance opening in the path of the rays entering said stenoscopic camera through said very small image-creating stenoscopic entrance opening at a distance from said very small image-creating stenoscopic entrance opening not exceeding the focal length of said concave spherical mirror; a rectangular convex spherical mirror having appreciably greater focal length than said rectangular concave spherical mirror and arranged in said stenoscopic camera in the path of the rays reflected by said rectangular concave spherical mirror with its axis inclined to the axis of said concave mirror; each of said rectangular spherical mirrors having a contour bounded by four planes being parallel to the axis of the respective mirror; and a carrier for a photosensitive surface arranged in said stenoscopic camera in the path of the rays reflected by said rectangular convex spherical mirror inclined to the axis of said convex mirror.

6. A stenoscopic camera comprising in combination a wall with a very small image-creating stenoscopic entrance opening acting as a "pinhole lens"; a concave spherical mirror arranged in said stenoscopic camera in the path of the rays entering said stenoscopic camera through said very small image-creating stenoscopic entrance opening with its axis inclined to the axis of said very small image-creating stenoscopic entrance opening at an angle of about 23° at a distance from said very small image-creating stenoscopic entrance opening not exceeding the focal length of said concave spherical mirror; a convex spherical mirror having appreciably greater focal length than said concave spherical mirror and arranged in said stenoscopic camera in the path of the rays reflected by said concave mirror with its axis inclined to the axis of said very small image-creating stenoscopic entrance opening at an angle of about 12°; and a carrier for a photosensitive surface arranged in said stenoscopic camera in the path of the rays reflected by said convex spherical mirror inclined to the axis of said convex mirror.

RENATO MOSCA.

REFERENCES CITED

The following references are of record in the file of this patent:

UNITED STATES PATENTS

| Number | Name | Date |
|---|---|---|
| 404,390 | Dutton | June 4, 1889 |
| 494,128 | Decker | Mar. 28, 1893 |
| 697,738 | Miller | Apr. 15, 1902 |
| 703,858 | Vautier | July 1, 1902 |
| 2,081,299 | Hill | May 25, 1937 |
| 2,192,755 | Rabkin et al. | Mar. 5, 1940 |
| 2,430,595 | Young | Nov. 11, 1947 |

FOREIGN PATENTS

| Number | Country | Date |
|---|---|---|
| 3,058 | Great Britain | of 1903 |

OTHER REFERENCES

Scientific American, August 1939, published in New York, New York, page 118.